Patented Feb. 15, 1938

2,108,413

UNITED STATES PATENT OFFICE 2,108,413

CONDENSATION PRODUCTS OF THE ANTHRAQUINONE SERIES

Heinz Scheyer, Frankfort-on-the-Main, and Emil Schwamberger, Frankfort-on-the-Main-Fechenheim, Germany, assignors to General Aniline Works, Inc., New York, N. Y., a corporation of Delaware No Drawing. Application March 13, 1936, Serial No. 68,688. In Germany March 15, 1935

4 Claims. (Cl. 260—44)

Our invention relates to condensation products of the anthraquinone series, more particularly those of the general formula:

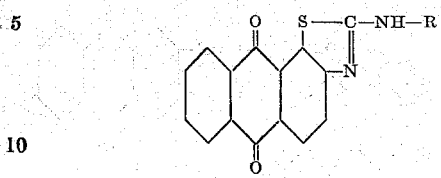

wherein R means the radicle of a polynuclear vatable compound containing an anthraquinone nucleus.

The new products are obtained by acting with primary amines of ring systems capable of being vatted in the presence of alkaline acting agents such as caustic alkalies, on anthraquinone-1.2(N)-thiazoles.

The reaction takes place in such a manner that the nitrogen atom of the amine is combined with the carbon atom of the thiazolic ring with the formation of a 2-aminothiazole-derivative. This course of reaction may be established by the fact that anthraquinone-thiazole compounds containing in the 2-position of the thiazole ring a non-reactive substituent such as methyl or phenyl group do not react, whereas on the other hand an anthraquinone thiazole, bearing in the 3-position of the anthraquinone nucleus bromine, yields a condensation product which according to analysis still contains the bromine atom.

The condensation product obtained by acting with 1-aminoanthraquinone on anthraquinone-1-2(N)-thiazole corresponds with the following formula:

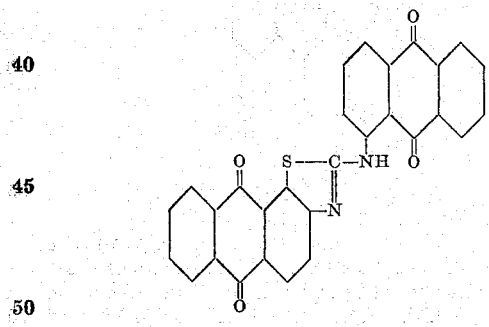

The new condensation products which contain no diazotizable amino group and correspond on analysis to the formulae presented are valuable dyestuffs of strong tinctorial power and good fastness. The most valuable dyestuffs are those which contain an anthraquinone radicle as the radicle R in the above general formula.

In order to further illustrate our invention the following examples are given, the parts being by weight and all temperatures in centigrade degrees. We wish it however to be understood that our invention is not limited to the particular products nor reaction conditions mentioned therein.

Example 1

A mixture of 27 parts of anthraquinone-1-2(N)-thiazole, 25 parts of 1-aminoanthraquinone, about 800 parts of pyridine and 100 parts of finely powdered caustic potash is stirred for some hours at about 50°. The separated violet-blue potassium salt of the condensation product formed is filtered off, washed with pyridine and then poured on dilute hydrochloric acid. The orange-red product formed is filtered off, washed and dried. The new condensation product of the above formula crystallizes from nitrobenzene in fine orange colored needles, soluble in concentrated sulfuric acid with an orange red color which is not changed by the addition of paraformaldehyde. It dyes cotton from a brownish red vat strong yellowish orange shades of good fastness.

By employing instead of the anthraquinone-1-2(N)-thiazole in the above example a derivative thereof containing a benzoylamino group in the anthraquinone nucleus and acting therewith on 1-amino-anthraquinone a condensation product is obtained which dyes from a brownish red vat a somewhat more reddish orange shade than the dyestuff above described.

The benzoylamino-anthraquinone-thiazole used for this condensation is obtained for example by starting from anthraquinone-1-2(N)-thiazole which is nitrated in concentrated sulfuric acid. The yellow nitro compound formed is reduced by known methods to the (red colored) amino compound which is benzoylated. The benzoylamino compound is obtained in yellow crystals, soluble in concentrated sulfuric acid with a yellow color.

Example 2

A mixture of 27 parts of anthraquinone-1-2(N)-thiazole, 36 parts of 1-amino-5-benzoylaminoanthraquinone, 800 parts of pyridine and 100 parts of powdered caustic potash is stirred for about 3 hours at about 50°. The separated greenish blue potassium salt of the condensation product formed is isolated as described in Example 1. The obtained red colored condensation product of the formula:

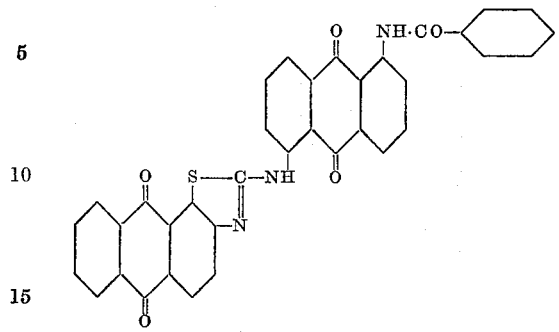

crystallizes from nitrobenzene in orange red colored needles, soluble in concentrated sulfuric acid with an orange red color. It dyes cotton from a dark red vat strong orange shades of very good fastness.

By employing 1-amino-4-benzoylaminoanthraquinone instead of the 1-amino-5-benzoylaminoanthraquinone in the above example and working up as there described a violet-brown crystalline product is obtained. It dyes cotton from a brownish red vat red-brown shades.

The condensation products formed in this manner can be converted by saponification of the benzoylamino groups, for example with sulfuric acid, into the free amines which may be used for further reactions of decomposition.

Example 3

A mixture of 26 parts of anthraquinone-1-2(N)-thiazole, 26 parts of 1-amino-4-methoxyanthraquinone, 800 parts of pyridine and 100 parts of powdered caustic potash is stirred for about 2 hours at 50°. The separated blue potassium salt of the condensation product formed is filtered off, washed with pyridine and decomposed by means of dilute hydrochloric acid. The dark red product formed of the formula:

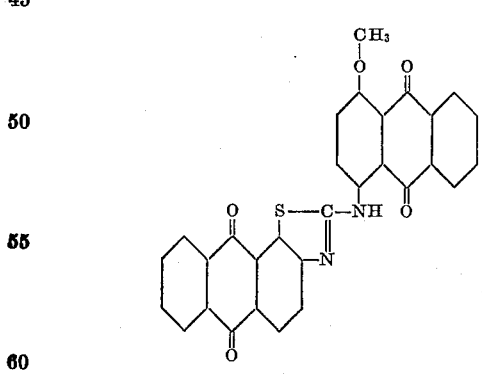

crystallizes from nitrobenzene in fine red colored needles, soluble in concentrated sulfuric acid with a cherry-red color which is not changed by the addition of paraformaldehyde. It dyes cotton from a brownish red hydrosulfite vat bluish red shades of very good fastness.

Example 4

A mixture of 40 parts of anthraquinone-1-2(N)-thiazole, 50 parts of 2-amino-3-bromoanthraquinone, 80 parts of nitrobenzene and 150 parts of powdered caustic potash is stirred for some hours at 50–60°. The separated potassium salt of the condensation product formed is filtered off, freed if necessary from the adhering nitrobenzene by washing with chlorobenzene and alcohol and then decomposed by means of dilute hydrochloric acid. The yellow product obtained crystallizes from nitrobenzene in yellow needles, soluble in concentrated sulfuric acid with an orange color.

The condensation product corresponds probably to the Formula I. When it is boiled in nitrobenzene in the presence of an acid binding agent such as sodium carbonate and copper it is converted apparently with separation of hydrogen bromide into a new fast yellow vat dyestuff which corresponds perhaps to the Formula II:

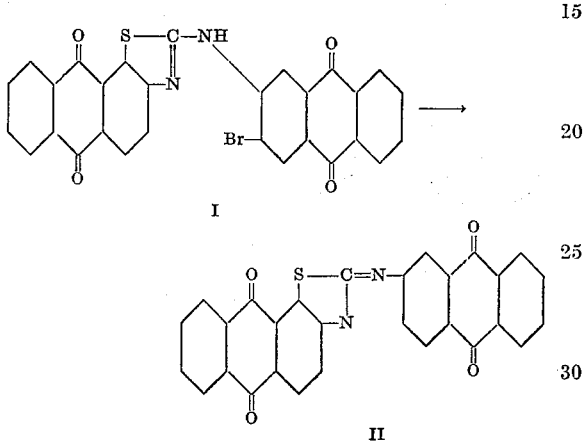

The condensation product (of the Formula I) dyes cotton from an olive colored vat greenish yellow shades of good fastness.

By acting with 1-chloro-2-aminoanthraquinone instead of the 2-amino-3-bromoanthraquinone in the above example on the anthraquinone-1-2(N)-thiazole a dyestuff is obtained which can be converted by after treatment into a yellow fast vat dyestuff being probably isomeric with the above described one.

Example 5

30 parts of the amino compound corresponding to the following formula:

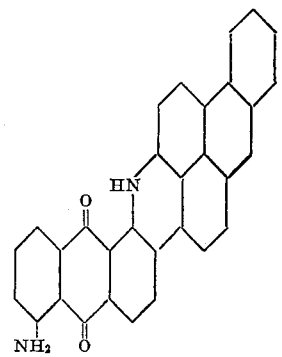

(which is prepared according to the process described in British specification No. 24 604/08 by acting with alkaline condensing agents on the 1-(Bz$_1$-benzanthronylamino)-5-aminoanthraquinone are suspended in 1500 parts of nitrobenzene. 16 parts of anthraquinone-1-2(N)-thiazole and 150 parts of powdered caustic potash are added and the mixture is stirred for about 20 hours at about 60°. The separated potassium salt of the condensation product formed is isolated as described in Example 4 and decomposed by means of dilute hydrochloric acid. A gray product of the following formula

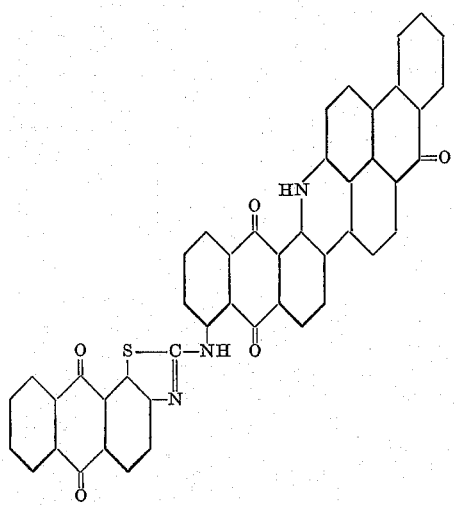

is obtained which can be further purified by extracting with chlorobenzene. It dyes cotton from a violet vat gray shades of good fastness. The dyestuff is soluble in concentrated sulfuric acid with an olive-green color.

*Example 6*

10 parts of an anthraquinonedithiazole corresponding to the following formula:

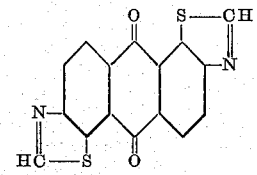

(which is obtained by acting with formic acid on 2.6-diamino-1.5-dimercaptoanthraquinone) are suspended in about 600 parts of quinoline. After the addition of 2.5 parts of 1-aminoanthraquinone and 100 parts of powdered caustic potash the mixture is stirred for about 20 hours at 50–60°. The separated condensation product formed is filtered off and decomposed by means of hydrochloric acid. A red colored product is obtained which is freed if necessary from the unaltered initial material by extracting with nitrobenzene. The pure product is a red colored powder, soluble in concentrated sulfuric acid with an orange color. It dyes cotton from a red vat reddish orange shades of very good fastness.

We claim:

1. Condensation products of the anthroquinone series of the general formula:

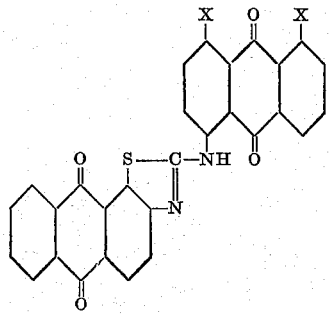

wherein one X stands for hydrogen and the other X stands for a member of the group consisting of hydrogen, acylamino and methoxy, which dyestuffs are distinguished by a strong tinctorial power and dye cotton fast reddish shades.

2. The condensation product of the anthraquinone series of the formula:

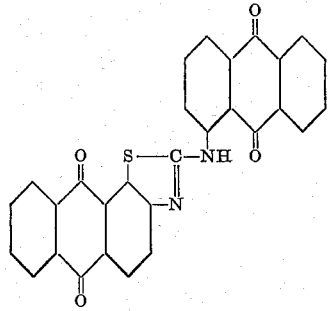

which dyestuff crystallizes from nitrobenzene in fine orange colored needles, soluble in concentrated sulfuric acid with an orange red color which is not changed by the addition of paraformaldehyde, and dyes cotton from a brownish red vat strong yellowish orange shades of good fastness.

3. The condensation product of the anthraquinone series of the formula:

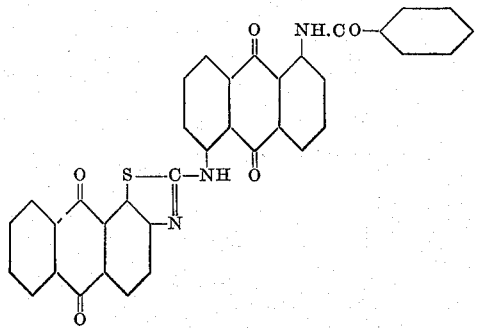

which dyestuff crystallizes from nitrobenzene in orange red colored needles, soluble in concentrated sulfuric acid with an orange red color, and dyes cotton from a dark red vat strong orange shades of very good fastness.

4. The condensation product of the anthraquinone series of the formula:

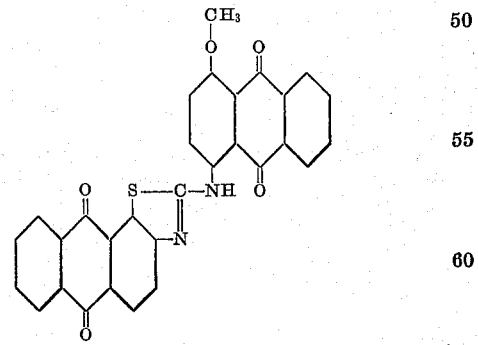

which dyestuff crystallizes from nitrobenzene in fine red colored needles, soluble in concentrated sulfuric acid with a cherry-red color, which is not changed by the addition of paraformaldehyde, and dyes cotton from a brownish red hyrosulfite vat bluish red shades of very good fastness.

HEINZ SCHEYER.
EMIL SCHWAMBERGER.